US010585654B2

(12) United States Patent
Singh et al.

(10) Patent No.: US 10,585,654 B2
(45) Date of Patent: Mar. 10, 2020

(54) DEPLOYMENT OF PROCESSING COMPONENTS OF COMPUTING INFRASTRUCTURE USING ANNOTATED COMMAND OBJECTS

(71) Applicant: VMware, Inc., Palo Alto, CA (US)

(72) Inventors: Ashish Singh, San Jose, CA (US); Kaushal Gala, San Jose, CA (US); Srikkanth Sundararajan, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 539 days.

(21) Appl. No.: 14/960,087

(22) Filed: Dec. 4, 2015

(65) Prior Publication Data

US 2017/0161042 A1   Jun. 8, 2017

(51) Int. Cl.
*G06F 8/60* (2018.01)

(52) U.S. Cl.
CPC ..................................... *G06F 8/60* (2013.01)

(58) Field of Classification Search
None
See application file for complete search history.

(56) References Cited

U.S. PATENT DOCUMENTS

| | | | | | |
|---|---|---|---|---|---|
| 7,496,912 | B2* | 2/2009 | Keller | .................. | G06F 8/61 717/120 |
| 7,926,051 | B2* | 4/2011 | Barta | .................. | G06F 8/61 717/174 |
| 9,219,727 | B2* | 12/2015 | Cameron | .................. | G06F 21/305 |
| 9,632,766 | B2* | 4/2017 | Shimamura | .................. | G06F 8/61 |
| 2002/0078142 | A1* | 6/2002 | Moore | .................. | G06F 8/658 709/203 |
| 2005/0071371 | A1* | 3/2005 | Woodhouse | .................. | G06F 8/658 |
| 2005/0132354 | A1* | 6/2005 | Edwards | .................. | G06F 8/61 717/174 |
| 2005/0278341 | A1* | 12/2005 | Kostadinov | .................. | G06F 8/65 |
| 2009/0077547 | A1* | 3/2009 | Kakinoki | .................. | G06F 8/656 717/168 |
| 2010/0257517 | A1* | 10/2010 | Sriram | .................. | G06F 8/658 717/168 |
| 2011/0016122 | A1* | 1/2011 | Motwani | .................. | G06F 16/182 707/736 |
| 2012/0324436 | A1* | 12/2012 | Milenovic | .................. | G06F 8/656 717/170 |

(Continued)

OTHER PUBLICATIONS

Calvin, "Recursive Functions", 2008, pages.cs.wisc.edu/~calvin/cs110/RECURSION.html.*

*Primary Examiner* — Hossain M Morshed
(74) *Attorney, Agent, or Firm* — Loza & Loza, LLP (57) ABSTRACT

System and method for deploying a processing component of a computing infrastructure in a computing environment with host computers use an annotated command object that includes an identifier, at least one requirement and a command to deploy the processing component. When the annotated command object is processed, the at least one requirement of the annotated command object is satisfied, which includes processing another annotated command object to deploy at least one of a required processing component and a required feature of a particular processing component. The command of the annotated command object is executed to deploy the processing component in the computing environment.

27 Claims, 8 Drawing Sheets

(56) References Cited

U.S. PATENT DOCUMENTS

2013/0247020 A1* 9/2013 Fontignie .................. G06F 8/63
  717/168
2014/0330975 A1* 11/2014 Abuelsaad .............. H04L 47/70
  709/226
2017/0161042 A1* 6/2017 Singh ........................ G06F 8/60

* cited by examiner

DEPLOYMENT OF PROCESSING COMPONENTS OF COMPUTING INFRASTRUCTURE USING ANNOTATED COMMAND OBJECTS

BACKGROUND

Deploying processing components of a computing infrastructure can be a complex process. For a typical computing infrastructure, some of the processing components may depend on other processing components with respect to their operation. Thus, in order to deploy a particular processing component of the computing infrastructure, information may be needed from the other processing components on which the particular processing component depends. In addition, if one or more of the other required processing components have not been deployed, then these other required processing components may need to be first deployed before the particular software component can be deployed. For a few processing components, the dependencies between these processing components that must be considered may not seem difficult. However, when hundreds or thousands of processing components are involved, the various dependencies between the processing components that must be considered can be daunting.

Due to these complexities, manually managing the different dependencies between processing components of a computing infrastructure to deploy these processing components can be labor intensive and time consuming. In addition, manually managing the different dependencies between the processing components can introduce human errors, which may significantly delay deployment or may result in faults in the computing infrastructure.

SUMMARY

System and method for deploying a processing component of a computing infrastructure in a computing environment with host computers use an annotated command object that includes an identifier, at least one requirement and a command to deploy the processing component. When the annotated command object is processed, the at least one requirement of the annotated command object is satisfied, which includes processing another annotated command object to deploy at least one of a required processing component and a required feature of a particular processing component. The command of the annotated command object is executed to deploy the processing component in the computing environment.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
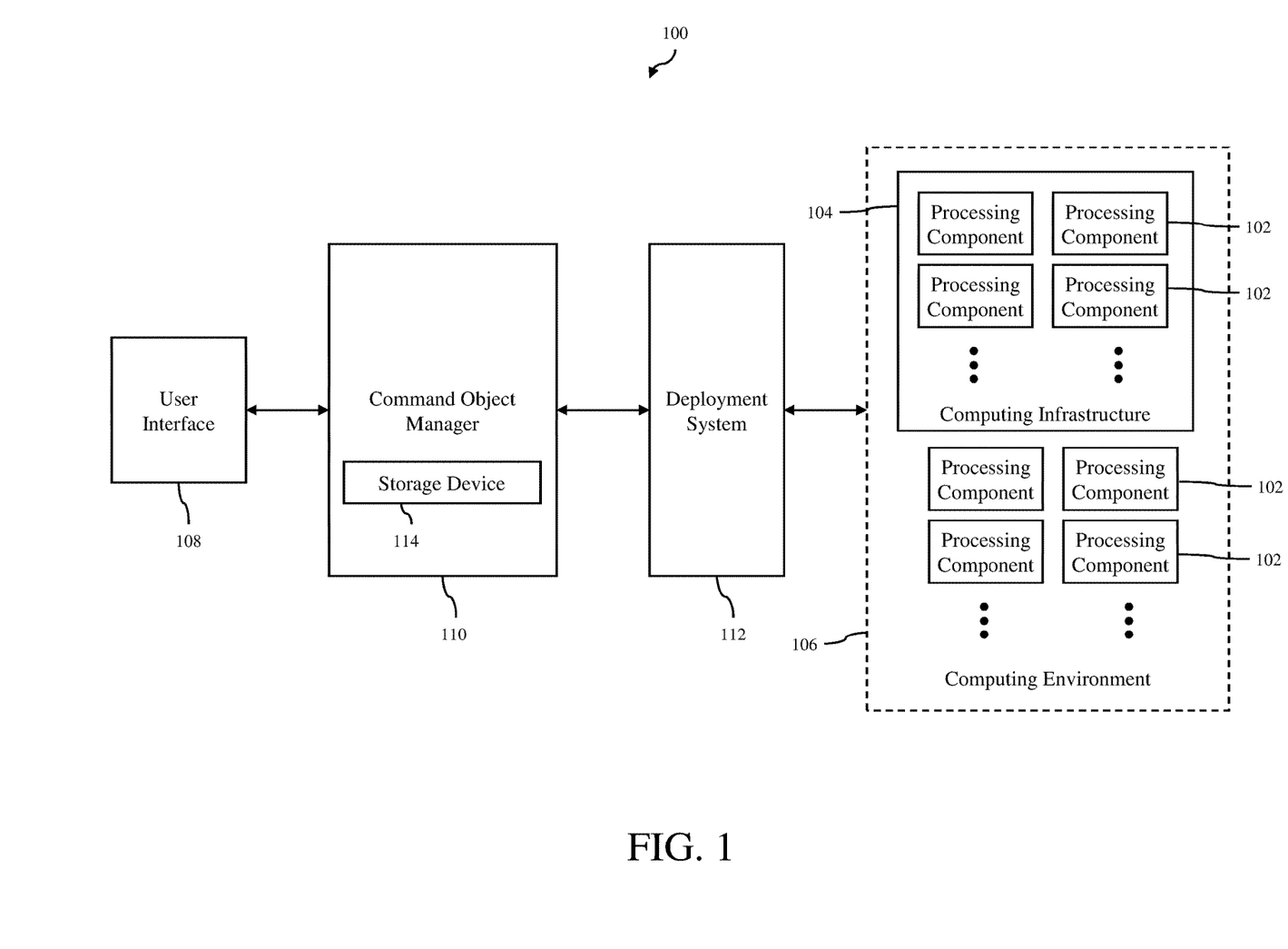
FIG. 1 is a block diagram of a processing component deployment (PCD) system in accordance with an embodiment of the invention.

FIG. 1 depicts a processing component deployment (PCD) system 100 in accordance with an embodiment of the invention. The PCD system can be used to deploy one or more processing components 102 of a computing infrastructure 104 in a computing environment 106. As used herein, a "processing component" can be any software entity or a group of software entities that can run on a computer system, such as a software application, a software process, a virtual machine (VM) or a "virtual container" that provides system-level process isolation. The computing infrastructure can be any infrastructure that includes multiple processing components. As an example, the computing infrastructure may be a multi-tier application infrastructure, a virtual datacenter infrastructure or a cloud computing infrastructure. As described in more detail below, the PCD system is designed so that users can easily deploy one or more processing components of a computing infrastructure using annotated command objects as simple building blocks, which can be used repeatedly. The annotated command objects allow much of the deployment process to be automated so that user involvement during the deployment process is minimized.

In a computing infrastructure with multiple processing components, some of the processing components may depend on other processing components for their operation. These processing components that depend on other processing components will be referred to herein as "dependent processing components." In addition, some of these dependent processing components may require that the other processing components have certain features enabled. Furthermore, some of these dependent processing components may require that one or more of the other processing components be part of a group or a cluster. Thus, in order to deploy the dependent processing components, the required processing components may first be deployed, if the required processing components has not been deployed, the required feature may first be enabled, if the required feature has not been enabled, and/or a cluster may first be defined, if such cluster has not been defined. Examples of such dependencies between processing components are illustrated in FIGS. 2A-2B using products from VMware, Inc.

Figure 2A:
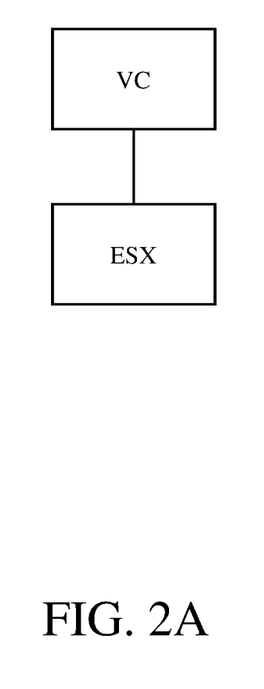
FIGS. 2A and 2B illustrate examples of dependencies between processing components using products from VMware, Inc.
Figure 2B:
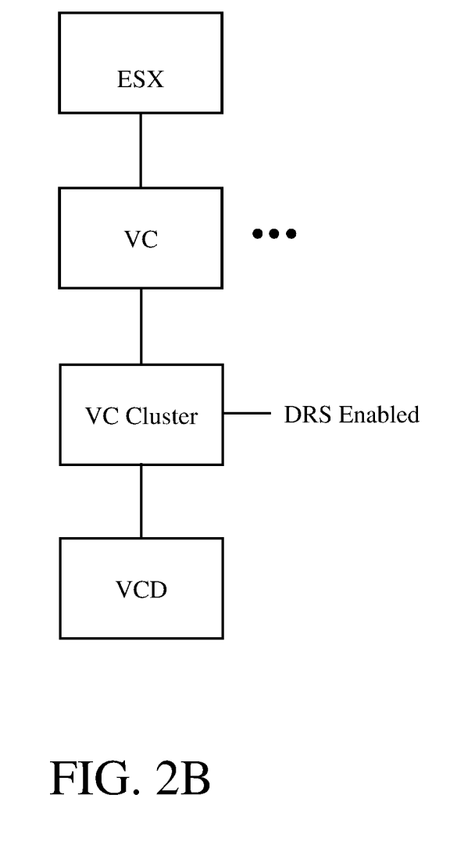

As shown in FIG. 2A, a VMware® vCenter™ ("VC") is associated with a VMware® ESX® ("ESX"). An ESX is required to deploy a VC. As shown in FIG. 2B, a VMware® vCloud Director® ("VCD") is associated with an ESX and a VC cluster, which may include one or more ESXs. In addition, a VCD requires that the VC cluster should include at least one ESX and a VMware vSphere® Distributed Resource Scheduler™ ("DRS") enabled cluster (a cluster is an inventory of ESX hosts). Thus, an ESX and a DRS feature enabled VC cluster with ESXs are required to deploy a VCD.

Typically, in order to deploy different processing components of a computing infrastructure, a user would need to understand and keep track of all the different requirements and dependencies between the various processing components. In addition, the user would need to know and keep track of all the different input parameters and output parameters for each of the processing components, including the processing components on which some of the processing components depend. Consequently, the management of the different requirements and dependencies between the various processing components, as well as all the different input parameters and output parameters, requires significant time and effort, and may introduce errors during the deployment processes.

Figure 3:
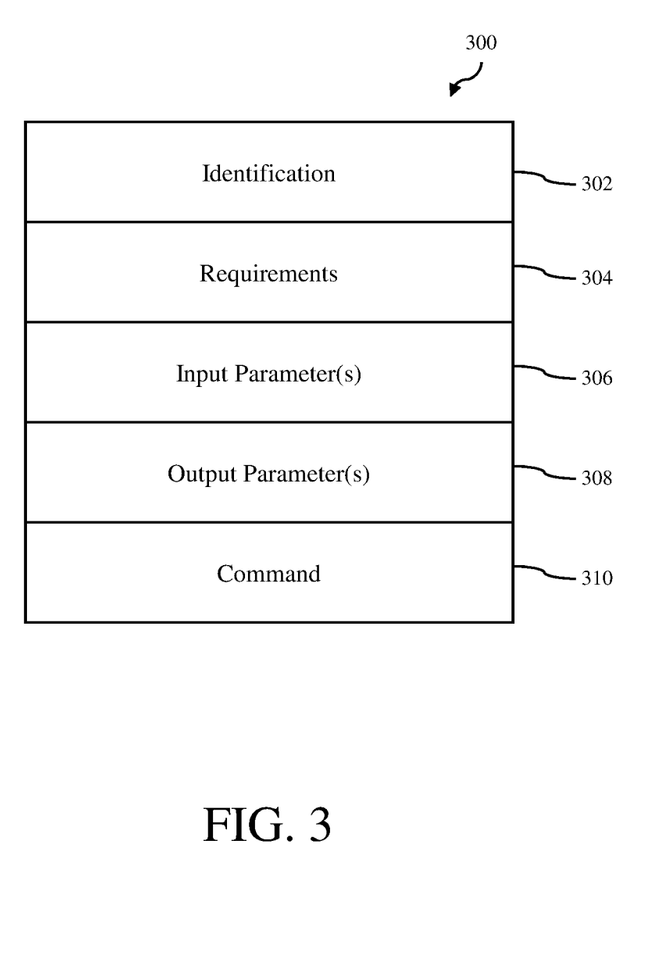
FIG. 3 is a diagram illustrating a generic annotated command object in accordance with an embodiment of the invention.

The PCD system 100 utilizes annotated command objects, which automate some of the deployment processes, as explained below. A generic annotated command object in accordance with an embodiment of the invention is illustrated in FIG. 3. As shown in FIG. 3, the annotated command object 300 includes an identification section 302, a requirement section 304, an input parameter section 306, an output parameter section 308, and a command section. Although a particular arrangement of these sections is illustrated in FIG. 3, different arrangements of the sections are possible. In addition, the annotated command object may include other sections with additional information.

The identification section 302 of the annotated command object 300 includes an identification that indicates the action to be performed using the annotated command object. As an example, the identification may indicate a processing component that will be deployed using the annotated command object or indicate a feature of a processing component that will be deployed or enabled using the annotated command object.

The requirement section 304 of the annotated command object 300 includes one or more requirements that are needed to execute the action associated with the annotated command object. As an example, the requirements may include other processing components and/or features of the processing components that are required to execute the action associated with the annotated command object.

The input parameter section 306 of the annotated command object 300 includes one or more input parameters that are needed to execute the action associated with the annotated command object. As an example, the input parameters may include user identification, password and Internet Protocol (IP) address for a required processing component for the processing component being deployed using the annotated command object.

The output parameter section 308 of the annotated command object 300 includes one or more output parameters that are produced as a result of the action associated with the annotated command object. As an example, the output parameters may include user identification, password and Internet Protocol (IP) address for the processing component being deployed using the annotated command object. This section will also contain parser details of the required output parameters. This will help to extract out the required output parameters from the executed command.

The command section 310 of the annotated command object 300 includes one or more commands that are needed to execute the action associated with the annotated command object. As an example, the command may include one or more scripts, one or more executable files or one or more file pointers/file paths or one or more URIs (Uniform Resource Identifiers) satisfying REST (Representational State Transfer)/SOAP (Simple Object Access Protocol)/RPC (Remote Procedure call) endpoints.

As an example, an annotated command object for deploying a VCD in accordance with an embodiment may be as follows:

```
===========================
1.   #@PRODUCT=VCD
2.   #@REQUIRES=ESX VC.CLUSTER.ESX VC.CLUSTER.DRS
3.   #@TITLE="Deploys VCD"
4.   #@INPUT=8
5.   #@ESX.CONNECT.IP=?
6.   #@ESX.CONNECT.USER=?
7.   #@ESX.CONNECT.PASSWORD=?
8.   #@VC.CONNECT.IP?
9.   #@VC.CONNECT.USER?
10.  #@VC.CONNECT.PASSWORD=?
```

```
11.     #@VCD.BUILD.PATH=?
12.     #@VCD.RESOURCE.MEM=?
13.     #@OUTPUT=3
14.     #@VCD.CONNECT.IP="IP address: ",15
15.     #@VCD.CONNECT.USER="Username: ",15
16.     #@VCD.CONNECT.PASSWORD= "Password: ",15
17.     /mts/git/bin/vcd-deploy $1 $2 $3 $4 $5 $6 $7 $8
```

In this example, the data structures, each of which may include strings or a list of strings, are as follows:

```
1.     CONNECT : {IP, PATH, USER, PASSWORD}
2.     RESOURCE : {CPU, MEM, STORAGE, FLASH, NETWORK}
3.     REQUIRES: {PRODUCT.COMPONENT.FEATURE}
```

In addition, REQUIRES can be as follows:

```
1.          REQUIRES=PRODUCT
2.          REQUIRES=PRODUCT.FEATURE
3.          REQUIRES=PRODUCT.COMPONENT.FEATURE
```

For REQUIRES, PRODUCT can be: PRODUCT=product/sub-product2/ . . . COMPONENT can be: COMPONENT=component1/sub-component2/ . . . FEATURE can be: FEATURE=feature1/sub-feature2/ . . . Examples of PRODUCTS include VMware® vCloud Director® (VCD), VMware® ESX®, VMware® vCenter™ (VC) VMware vRealize Automation (VRA), VMware vRealize Operations (VROPS), VMware NSX™ VMware® vShield™, WINDOWS_VM (any Microsoft Windows VM), LINUX_VM (any Linux Distribution VM), DOCKER, PHOTON (VMware cluster for containers), KUBERNETES (Google's Cluster Manager for Linux containers), OSV (e.g. include VM infrastructure/mgmt nodes, container infrastructure/mgmt nodes, unikernel nodes, etc). Examples of COMPONENTS include CLUSTER, DATACENTER, RESOURCEPOOL. Examples of FEATURES include VMware vSphere® Distributed Resource Scheduler™ (DRS), VMware vSphere® High Availability (HA), VMware Enhanced vMotion Compatibility (EVC), VMware instant clone technology (VMFORK).

In the above annotated command object for deploying a VCD, line 1 is the identification of a product associated with the annotated command object, which in this example is a product named "VCD". Line 2 is the requirement section that specifies the requirements needed to deploy a VCD, which include "ESX", "VC.CLUSTER.ESX" and "VC.CLUSTER.DRS". Line 3 is the identification section that identifies the action to be performed using annotated command object, which in this example is "Deploys VCD". Lines 4-12 are the input parameter section that specifies the input parameters to deploy a VCD. In particular, line 4 specifies the number of input parameters specified in the annotated command object. In addition, lines 5-12 describe the different input parameters. The user will provide input specified at line 11 and 12. Skipping lines 13-16 for the moment, line 17 is the command section that specifies the command to be invoked when the annotated command object is executed. The command also specifies the number of input parameters, which is eight for this annotated command object. Lines 13-16 are the output parameter section that specifies the output parameters to be captured when the command invoked and the VCD is deployed. In particular, line 13 specifies the number of output parameters specified in the annotated command object. In addition, lines 14-16 describe the different output parameters that will be retrieved as a result of the deployment of the VCD product. As an example, "IP address:" will be searched and follow up 15 characters will be captured as VCD.CONNECT.IP for future usage.

Turning back to FIG. 1, The PCD system 100 includes a user interface 108, a command object manager 110, a deployment system 112 and the computing environment 106. These components of the PCD system may be implemented in any combination of hardware, software and/or firmware. In a particular implementation, these components except for the computing environments are software programs running on one or more computer systems executed by processors associated with the computer systems.

The user interface 108 of the PCD system 100 allows a user to interact with the command object manager 110. In particular, the user may input information into the command object manager and view information provided by the command object manager. In some embodiments, the user interface may include one or more graphical user interfaces.

The command object manager 110 of the PCD system 100 operates to process annotated command objects in response to user input to execute actions related to processing components when the annotated command objects are activated, such as deploying one or more processing components in the computing environment 106, enabling features in processing components running in the computing environment and adding processing components to defined clusters of processing components in the computing environment.

Figure 4:
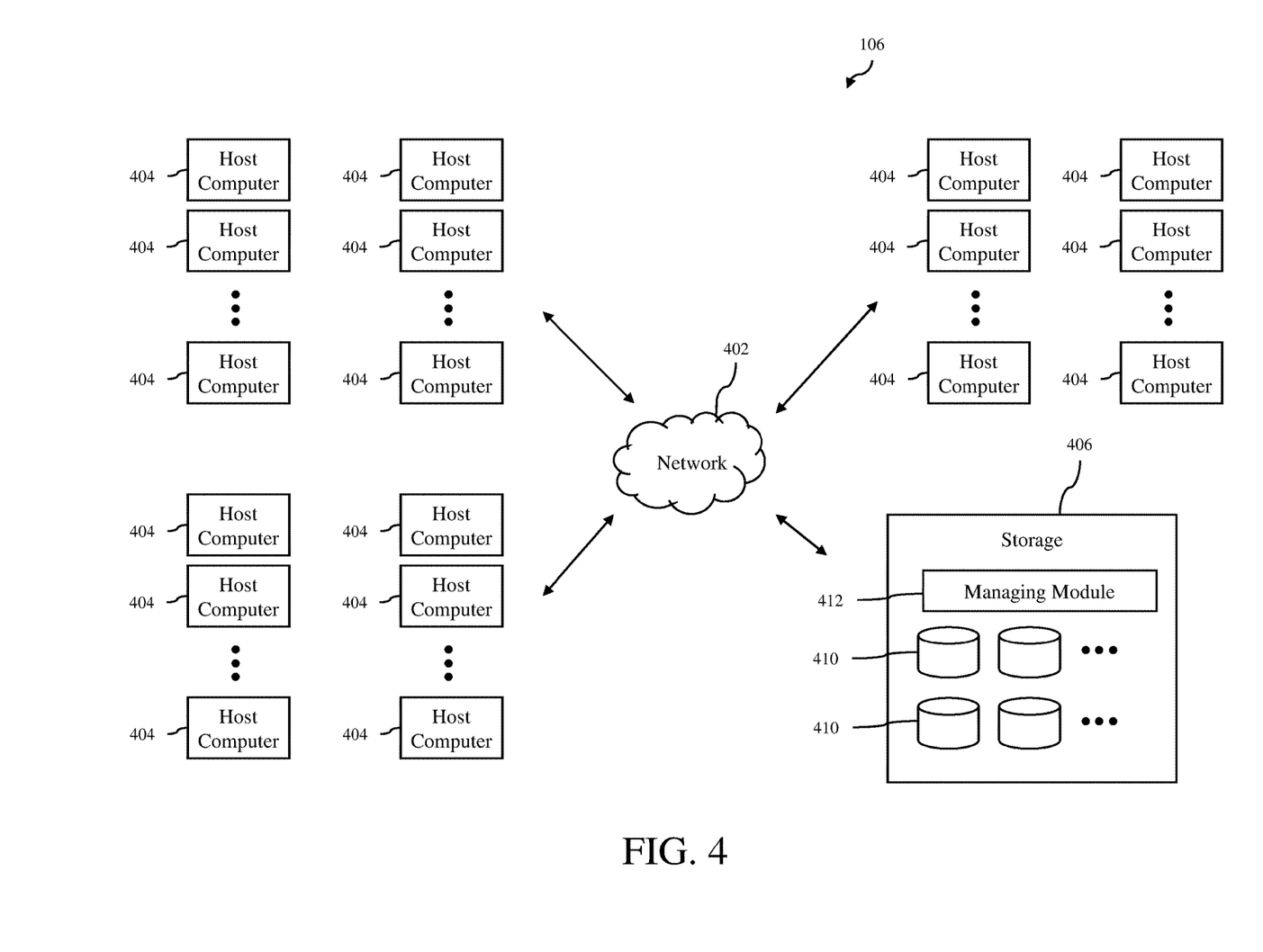
FIG. 4 is a diagram illustrating components of a computing environment of the PCD system in accordance with an embodiment of the invention.

Turning now to FIG. 4, components of the computing environment 106 in accordance with an embodiment of the invention are illustrated. As shown in FIG. 4, the computing environment includes a network 402, a number of host computers 404 and storage 406. The host computers and the storage are connected to the network. Thus, each of the host computers is able to access the storage via the network and may share the resources provided by the storage. Consequently, any process running on any of the host computers may also access the storage via the network.

In the illustrated embodiment, the host computers 404 are physical computer systems that host or support one or more processing components so that the processing components are executing on the physical computer systems. The host computers may be servers that are commonly found in data centers. As an example, the host computers may be servers installed in one or more server racks.

Figure 5:
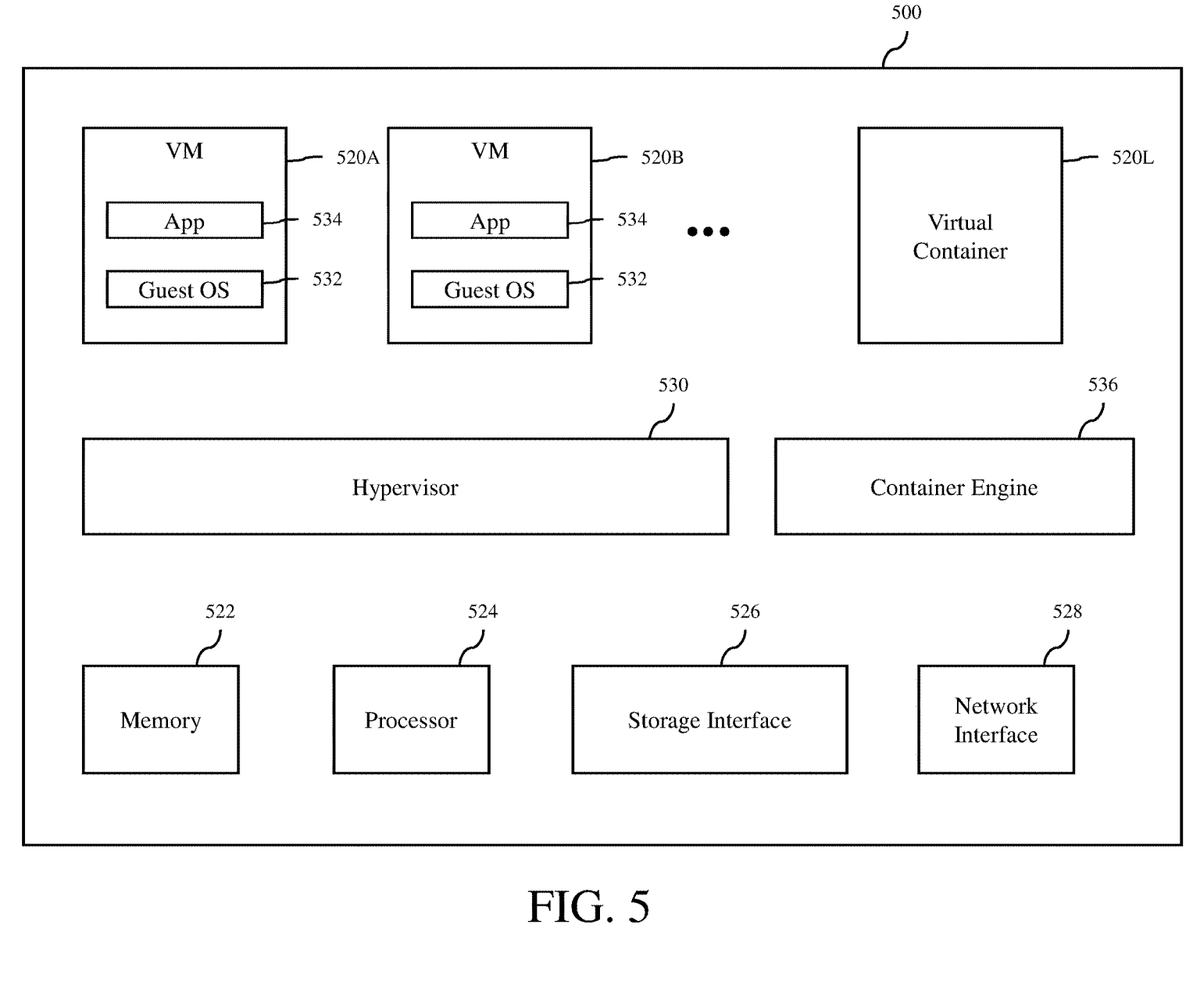
FIG. 5 is a block diagram of a host computer of the computing environment in accordance with an embodiment of the invention.

Turning now to FIG. 5, components of a host computer 500 that is representative of the host computers 404 in accordance with an embodiment of the invention are shown. In FIG. 5, the physical connections between the various components of the host computer are not illustrated. In the illustrated embodiment, the host computer is configured to support a number of processing components 520A, 520B . . . 520L (where L is a positive integer). In this illustrated example, the processing components 520A and 520B are virtual machines (VMs) and the processing component 520L is a virtual container. The number of processing components supported by the host computer can be anywhere from one to more than one hundred. The exact number of processing components supported by the host computer is only limited by the physical resources of the host computer. The processing components share at least some of the hardware resources of the host computer, which include system memory 522, one or more processors 524, a storage interface 526, and a network interface 528. The system memory, which may be random access memory (RAM), is the primary memory of the host computer. The processor can be any type of a processor, such as a central processing unit (CPU) commonly found in a server. The storage interface is an interface that allows that host computer to communicate with the storage 406. As an example, the storage interface may be a host bus adapter or a network file system interface. The network interface is an interface that allows the host computer to communicate with other devices connected to the network 402. As an example, the network interface may be a network adapter.

In the illustrated embodiment, VMs running on the host computer 500, such as the VMs 520A and 520B, run on "top" of a hypervisor 530, which is a software interface layer that, using virtualization technology, enables sharing of the hardware resources of the host computer 500 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide isolated execution spaces for guest software. Each VM may include a guest operating system 532, one or more guest applications 534. The guest operating system manages virtual system resources made available to the corresponding VM by the hypervisor, and, among other things, the guest operating system forms a software platform on top of which the guest applications run.

Virtual containers running on the host computer 500, such as the virtual container 520L, are supported by a container engine 536, which may run on top of the host computer's operating system. Other processing components running on the host computer may run in the VMs or virtual containers, on top of the host computer's operating system or directly on hardware of the host computer.

Similar to any other computer system connected to the network 402, the processing components 520A, 520B . . . 520L are able to communicate with other computer systems connected to the network using the network interface 528 of the host computer 500. In addition, the processing components are able to access the storage 404 using the storage interface 526 of the host computer.

Turning back to FIG. 1, the network 402 can be any type of computer network or a combination of networks that allows communications between devices connected to the network. The network 402 may include the Internet, a wide area network (WAN), a local area network (LAN), a storage area network (SAN), a fibre channel network and/or other networks. The network 402 may be configured to support protocols suited for communications with storage arrays, such as Fibre Channel, Internet Small Computer System Interface (iSCSI), Fibre Channel over Ethernet (FCoE) and HyperSCSI.

The storage 406 is used to store data for the host computers 404, which can be accessed like any other storage device connected to computer systems. In an embodiment, the storage can be accessed by entities, such as processing components (e.g., VMs) running on the host computers, using any file system, e.g., virtual machine file system (VMFS) or network file system (NFS). The storage includes one or more computer data storage devices 410, which can be any type of storage devices, such as solid-state devices (SSDs), hard disks or a combination of the two. The storage devices may operate as components of a network-attached storage (NAS) and/or a storage area network (SAN). The storage includes a storage managing module 412, which manages the operation of the storage. In an embodiment, the storage managing module is a computer program executing on one or more computer systems (not shown) of the storage.

Turning back to FIG. 1, the command object manager 110 of the PCD system 100 operates to perform various operations to ensure that actions specified in annotated command objects, which can be activated by users, are executed with minimal user involvement. When a user wants to execute an action related to one or more processing components, the command object manager provides the appropriate annotated command object to the user via the user interface 108 for the user to activate. The appropriate annotated command object may be selected from a number of annotated command objects, which are stored in a computer storage device 114 accessible by the command object manager. Although the computer storage device is shown in FIG. 1 as being local or within the command object manager, the computer storage device may be located anywhere, as long as the computer storage device is accessible by the command object manager. If there are multiple appropriate annotated command objects for the action requested by the user, the command object manager can provide all the appropriate annotated command objects or some subset of all the appropriate annotated command objects to the user for the user to select.

When the user has selected the appropriate annotated command object, the command object manager 110 may request one or more input parameters to be entered by the user via the user interface 108. The exact input parameters requested to be entered by the user will depend on the selected annotated command object, in particular, the action related to one or more processing components that will be performed when the annotated command object is activated and executed. As an example, the input parameters to be entered by the user may include any desired customization of resources or credentials (username/password) for the processing component being deployed using the selected annotated command object.

After one or more input parameters have been entered by the user, the user can be notified via the user interface 108 that the annotated command object is ready to be activated. When the user has activated the annotated scripted object using the user interface, the command object manager 110 executes the annotated scripted object. As part of this execution process, the command object manager examines the requirement(s) in the annotated command object to execute the action specified in the annotated command object. For each requirement in the annotated command object, the annotated command manager performs one or more operations to satisfy that requirement. These operations may involve selecting an already deployed processing component, adding a deployed processing component to a cluster, deploying a new processing component and/or enabling a feature in a processing component.

In an embodiment, an inventory of processing components that have been deployed in the computing environment is maintained by the command object manager 110. The inventory may include detailed information about each of the deployed processing components, including features enabled in the deployed processing components and whether the deployed processing components belong to one or more clusters. This inventory may be stored in any computer storage device accessible by the command object manager, such as the computer storage device 114.

If the requirement is a particular processing component, the command object manager 110 will search the inventory to find at least one of the deployed processing components that can satisfy the required processing component. If there is more than one deployed processing component that can satisfy the required processing component, then all the matching processing components or a subset of the matching processing components may be presented to the user using the user interface 108 for user selection. When one of the matching processing components has been selected, the command object manager will retrieve information regarding the selected processing component that is needed to execute the action specified in the activated annotated command object. In an embodiment, the information regarding the selected processing component may be one or more output parameters extracted when the selected processing component was first deployed. As an example, the information may include user name, password and Internet Protocol (IP) address for the selected processing component. However, if the required processing component cannot be found among the deployed processing components, the command object manager will process another annotated script object for deploying a new processing component to satisfy the required processing component, as explained below.

If the requirement is a feature of a particular processing component, the command object manager will search the inventory to find at least one of the deployed processing components with the required feature that can satisfy the required feature. If there is more than one deployed processing component that can satisfy the required feature, then all the matching processing components or a subset of the matching processing components may be presented to the user using the user interface 108 for the user make the selection. When one of the matching processing components has been selected, the command object manager may retrieve information regarding the selected processing component that may be needed to execute the action specified in the activated annotated command object.

This process of satisfying each requirement of the original annotated command object and any subsequent annotated command objects, which may be needed to properly process the original annotated command object, is repeated until all the requirements of the original annotated command object have been satisfied. For each requirement, information regarding that requirement may be retrieved by the command object manager to be used as one or more input parameters for the annotated scripted object to which that requirement was needed. The information regarding a requirement may include one or more output parameters that were extracted when that requirement was deployed.

After all the requirements for the original annotated command object have been satisfied, the command object manager 110 will execute the command of the original annotated command object. The executed command will direct the deployment system 112 to perform the action to deploy a processing component, to add a processing component to a cluster, or to enable a feature specified in the original annotated command object.

The command object manager 110 may be implemented in any combination of hardware, software and firmware. In a particular implementation, the command object manager is implemented as one or more software programs running on one or more physical computer systems, such as the host computers 404 in the computing environment 106. In this implementation, one or more processors associated with one or more of the physical computer systems may execute an algorithm to perform the operations of the command object manager that are described below.

The deployment system 112 of the PCD system 100 operates to perform one or more operations to carry out the commands of annotated command objects that have been executed by the command object manager 110. When a command of an annotated command object has been executed, the deployment system directs the deployment of a processing component in the computing environment, the addition of a processing component to a cluster in the computing environment or deployment/enablement of a feature of a deployed processing component in the computing environment using the input parameter(s) specified in the annotated command object and retrieves the output parameter(s) specified in the annotated command object as a result of the addition/deployment/enablement (collectively referred to herein as "deployment"). The deployment system then sends the output parameter(s) to the command object manager. In an embodiment, for deploying a processing component, the deployment system selects a host computer in the computing environment 106 and creates the processing component in the selected host computer. For deploying/enabling a feature of a deployed component, the deployment system selects the deployed processing component, automatically logs in to the processing component and changes the setting of the processing component to enable the desired feature. As an example, the deployment system may automatically log in to a VC and change the setting on the VC to enable DRS on a particular VC cluster. For deploying/adding a deployed processing component to a cluster, the deployment system selects the deployed processing component and registers that processing component to a management component in the computing environment 106 to be added to a cluster. As an example, the deployment system may automatically log in to a management VC and add the processing component to the cluster being managed by the management VC.

In an embodiment, the deployment system 112 may include one or more software modules that can facilitate the deployment of processing components, the addition of processing components to cluster and/or the enablement of features of processing components. As an example, the deployment system may include VMware® vCenter™ Orchestrator™, VMware vRealize Automation that can deploy VMs, ESXs, VC and VCDs, add VCs to VC clusters and enable features, such as DRS, in VC clusters.

The operation of the PCD system 100 will be described with reference to a flow diagram of FIG. 6 using the "Deploys VCD" annotated command object as an example of an annotated command object processed by the PCD system. At block 602, assuming that a user desires to execute an action specified by a particular annotated command object, that annotated command object is selected and activated by the user using the user interface 108. As example, if the user wants to deploy a VCD, the "Deploys VCD" annotated command object would be selected and activated by the user. The particular annotated command object may be presented to the user on the user interface by the command object manager 110 either alone or with other appropriate annotated command objects in response to a search query by the user using the user interface to be selected by the user.

At block 604, in response to the activation of the particular annotated command object, the first requirement in the requirement section of the activated annotated command object is selected by the command object manager 110. In the example of the "Deploys VCD" annotated command object being processed, the first requirement in the requirement section of the activated annotated command object would be to deploy "ESX".

Next, at block 606, a determination is made by the command object manager 110 whether the requirement is currently satisfied. In the example of the "Deploys VCD" annotated command object being processed, a determination is made by the command object manager whether an appropriate ESX is already deployed in the computing environment 106. If the current requirement is not already deployed, then the operation proceeds to block 608, where an appropriate annotated command object is processed to satisfy the current requirement. In the example, it would be an annotated command object to deploy an ESX. Below is an annotated command object for deploying an ESX in accordance with an embodiment.

```
===============
1.      #@PRODUCT=ESX
2.      #@REQUIRES=INVENTORY
3.      #@TITLE="Deploys ESX"
4.      #@INPUT=4
5.      #@INVENTORY.CONNECT.IP=?
6.      #@INVENTORY.CONNECT.USER=?
7.      #@INVENTORY.CONNECT.PASSWORD=?
8.      #@ESX.BUILD.PATH=?
8.      #@OUTPUT=3
9.      #@ESX.CONNECT.IP="IP address: ",15
10.     #@ESX.CONNECT.USER="Username: ",15
11.     #@ESX.CONNECT.PASSWORD="Password: ",15
12.     /mts/git/bin/create-esx $1 $2 $3 $4
=========================
```

Deployment of ESX product requires INVENTORY. It will also need four (4) input items, out of which building the INVENTORY will populate three (3) and the user will provide one (1) input that is the build path of ESX installation binaries. Eventually, line 12 will be executed by passing all the four (4) inputs.

The prerequisite product specified in @REQUIRES is called "INVENTORY," which is acquired from below. INVENTORY could be Out-of-band management details of the bare hardware systems.

```
===============
1.      #@PRODUCT=INVENTORY
2.      #@REQUIRES=
3.      #@TITLE="Gets inventory of hosts"
4.      #@OUTPUT=3
5.      #@INVENTORY.CONNECT.IP="IP address: ",15
6.      #@INVENTORY.CONNECT.USER="Username: ",15
7.      #@INVENTORY.CONNECT.PASSWORD="Password: ",15
8.      /mts/git/bin/get-available-systems
=========================
```

Above is an annotated command object that acquires or builds INVENTORY product. This is the basic building block or leaf node. This annotated command object does not have any requirement specified in @REQUIRES tag. Executing line 8 retrieves all the information it needs from the system about available hardware systems. The information may include Out-of-band management details of the bare hardware systems.

Below is an annotated command object for deploying a VC in accordance with an embodiment.

```
===============
1.      #@PRODUCT=VC
2.      #@REQUIRES=ESX
3.      #@TITLE="Deploys VC"
4.      #@INPUT=4
5.      #@ESX.CONNECT.IP=?
6.      #@ESX.CONNECT.USER=?
7.      #@ESX.CONNECT.PASSWORD=?
8.      #@VC.BUILD.PATH=?
9.      #@OUTPUT=3
10.     #@VC.CONNECT.IP="IP address: ",15
11.     #@VC.CONNECT.USER="Username: ",15
12.     #@VC.CONNECT.PASSWORD="Password: ",15
13.     /mts/git/bin/create-vc $1 $2 $3 $4
=========================
```

The above annotated command object is titled "Deploys VC" and requires "ESX" (line 2) and four (3) input parameters (lines 5-7) to deploy a VC. The initial three (3) input parameters will be populated by deploying the dependencies and one input will be specified by the user. The annotated command object also retrieves three (3) output parameters (lines 9-11).

After the appropriate annotated command object for the current requirement has been processed at block 608, the operation then proceeds to block 614. However, if the current requirement is already deployed, the operation proceeds to optional block 610, where the deployed requirement may be presented to the user via the user interface 108 for accepting the deployed requirement. If there are multiple choices, then all or some of those choices can be presented to the user for accepting one of the choices. Next, at block 612, a determination is made by the command object manager 110 whether the user has accepted a particular deployed requirement using the user interface. If no, then the operation proceeds to block 608, where an appropriate annotated command object is processed to deploy a new requirement that will satisfy the current requirement. However, if the user has accepted a particular deployed requirement, then the operation proceeds to block 614, where a determination is made by the command object manager whether the current requirement is the last requirement specified in the original annotated command object.

If the current requirement is not the last requirement, the operation proceeds to block 616, where the next requirement specified in the original annotated command object is selected by the command object manager 110 to process, i.e., blocks 606 to 614. In the example of the "Deploys VCD" annotated command object being processed, the next requirement is VC.CLUSTER.ESX. Below is an annotated command object for deploying a VC.CLUSTER.ESX in accordance with an embodiment.

```
===============
1.      #@PRODUCT=VC.CLUSTER.ESX
2.      #@REQUIRES=ESX VC.CLUSTER
3.      #@TITLE="Adds ESX to VC cluster"
4.      #@INPUT=6
5.      #@VC.CONNECT.IP?
6.      #@VC.CONNECT.USER?
7.      #@VC.CONNECT.PASSWORD?
8.      #@ESX.CONNECT.IP=?
9.      #@ESX.CONNECT.USER=?
10.     #@ESX.CONNECT.PASSWORD=?
11.     #@OUTPUT=3
12.     #@VC.CONNECT.IP="IP address: ",15
13.     #@VC.CONNECT.USER="Username: ",15
14.     #@VC.CONNECT.PASSWORD="Password: ",15
15.     /mts/git/bin/vc-add-esx-cluster $1 $2 $3
=========================
```

The above annotated command object is titled "Adds ESX to VC cluster" and requires "ESX" and "VC.CLUSTER" (line 2) and six (6) input parameters (lines 5-10) to deploy VC.CLUSTER.ESX, which is equivalent to adding an ESX to a VC cluster. The annotated command object also retrieves three (3) output parameters (lines 12-14).

Since the "Adds ESX to VC cluster" annotated command object requires "ESX" and "VC.CLUSTER", an annotated command object to deploy an ESX and an annotated command object to deploy a VC cluster may also need to be processed as the "Adds ESX to VC cluster" annotated command object is processed. The annotated command object for deploying an ESX was described previously. Below is an annotated command object for deploying a VC cluster, which involves deploying a cluster inside a VC, in accordance with an embodiment.

```
===============
1.    #@PRODUCT=VC.CLUSTER
2.    #@REQUIRES=VC
3.    #@TITLE="Deploys VC cluster"
4.    #@INPUT=3
5.    #@VC.CONNECT.IP=?
6.    #@VC.CONNECT.USER=?
7.    #@VC.CONNECT.PASSWORD=?
8.    #@OUTPUT=3
9.    #@VC.CONNECT.IP="IP address: ",15
10.   #@VC.CONNECT.USER="Username: ",15
11.   #@VC.CONNECT.PASSWORD="Password: ",15
12.   /mts/git/bin/vc-create-cluster $1 $2 $3
===========================
```

The above annotated command object is titled "Deploys VC cluster" and requires "VC" (line 2) and three (3) input parameters (lines 5-7) to deploy a VC cluster. The annotated command object also retrieves three (3) output parameters (lines 9-11).

This process of satisfying each requirement is repeated for all the remaining requirements specified in the original annotated command object. In the example of the "Deploys VCD" annotated command object being processed, only remaining requirement specified in the "Deploys VCD" annotated command object is the "VC.CLUSTER.DRS" requirement, and thus, an annotated command object for deploying or enabling a DRS in a VC may need to be processed. Below is an annotated command object for enabling a DRS in a VC in accordance with an embodiment.

```
===========================
1.    #@PRODUCT=VC.CLUSTER.DRS
2.    #@REQUIRES=VC.CLUSTER
3.    #@TITLE="Enable DRS in VC"
4.    #@INPUT=3
5.    #@VC.CONNECT.IP=?
6.    #@VC.CONNECT.USER=?
7.    #@VC.CONNECT.PASSWORD=?
8.    #@OUTPUT=3
9.    #@VC.CONNECT.IP="IP address: ",15
10.   #@VC.CONNECT.USER="Username: ",15
11.   #@VC.CONNECT.PASSWORD="Password: ",15
12.   /mts/git/bin/vc-enable-drs $1 $2 $3
===========================
```

The above annotated command object is titled "Enable DRS in VC" and requires "VC.CLUSTER" (line 2) and three (3) input parameters (lines 5-7) to deploy or Enable DRS in a VC of a VC cluster. The annotated command object also retrieves three (3) output parameters (lines 9-11), which is equivalent to enabling DRS in a VC.

Figure 6:
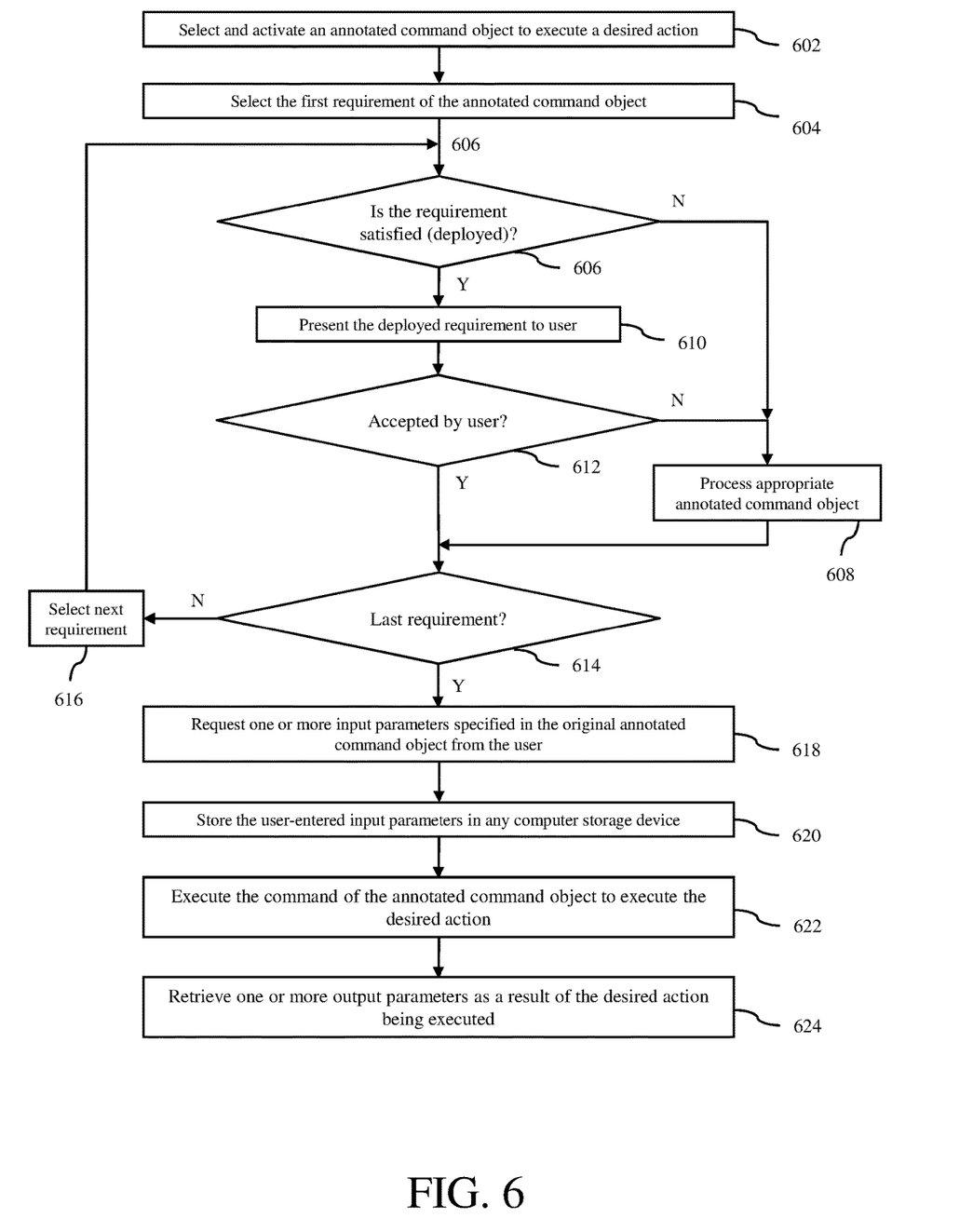
FIG. 6 is a process flow diagram of the operation of the PCD system in accordance with an embodiment of the invention.

Turning back to the flow diagram of FIG. 6, at block 618, one or more input parameters specified in the original annotated command object are requested from the user by the command object manager using the user interface. In the example of the "Deploys VCD" annotated command object being processed, VCD.BUILD.PATH (location of VCD installation binaries) and VCD.RESOURCE.MEM (memory configuration) would be requested from the user. Next, at block 620, the user-entered input parameters are stored in any computer storage device by the command object manager for use.

At block 622, the command of the original annotated command object is executed by the command object manager 110 to execute the desired action in the computing environment. "Deploys VCD" annotated command object contains the command on line 17 as "/mts/git/bin/vcd-deploy $1 $2 $3 $4 $5 $6 $7 $8" to deploy a VCD. The execution of the command initiates the deployment system 112 to perform operations to achieve the action specified in the original annotated command object, which in this example is to deploy a VCD in the computing environment.

Next, at block 624, one or more output parameters as a result of the desired action being executed are retrieved by the command object manager for future use. In the example of the "Deploys VCD" annotated command object being processed, the output parameters are "VCD.CONNECT.IP," VCD.CONNECT.USER" and "VCD.CONNECT.PASSWORD," which may be searched by the command object manager when the VCD is deployed as a result of the command of the original annotated command object being executed.

The above operation has been described with a single instance for each of the requirements specified in the original annotated command object. However, in some situations, multiple instances of the requirements may be needed. In these situations, multiple instances can be deployed using a notation, such as array "[ ]" notation as seen in typical programming constructs (e.g., C, C++ or Java) for each processing component and feature specified in annotated command objects. However, in other embodiments, other notations may be used to denote multiple instances.

The array "[ ]" notation following a processing component (which may be a component of a processing component) or a feature of a processing component specifies the number of instances of that processing component or feature. The following three examples show how array "[ ]" notations can be used for requirements in an annotated command object.

The first example is as follows:

```
#@REQUIRES=VC.CLUSTER[0].ESX[0]VC.
    CLUSTER[1].ESX[1]VC.CLUSTER[1].DRS
```

This example would mean create one (1) instance of VC, create two (2) VC clusters (numbered 0 and 1) create two (2) instances of ESX (numbered 0 and 1), add first ESX to the first VC cluster, add second ESX to the second VC cluster and turn on DRS on the second VC cluster.

The second example is as follows:

```
#@REQUIRES=VC[4].CLUSTER[2].DRS
```

This example would mean create five (5) instances of VCs (numbered 0 to 4), create three (3) VC clusters (numbered 0 to 2) and enable DRS in the third VC cluster.

The third example is as follows:

```
#@REQUIRES=VC.CLUSTER.ESX[0 . . . 5]VC.
    CLUSTER.DRS
```

This example would mean create one (1) instance of VC cluster, create six (6) instances of ESX (numbered 0 to 5), add six (6) instances of ESX to the VC cluster and enable DRS in the VC cluster. As used herein, " . . . " means range of PRODUCTS.

When processing an annotated command object, significant processing time may be required if requirements specified in the annotated command object necessitates deploying one or more new processing components in the computing environment 106. In order to reduce the amount of time required for deployment of new processing components, in some embodiments, the PCD system 100 may utilize a cache pool of candidate processing components that can be readily deployed in the computing environment. The candidate processing components may be processing components that are in a quiesced state, which can be viewed as being in a temporarily inactive state.

Figure 7:
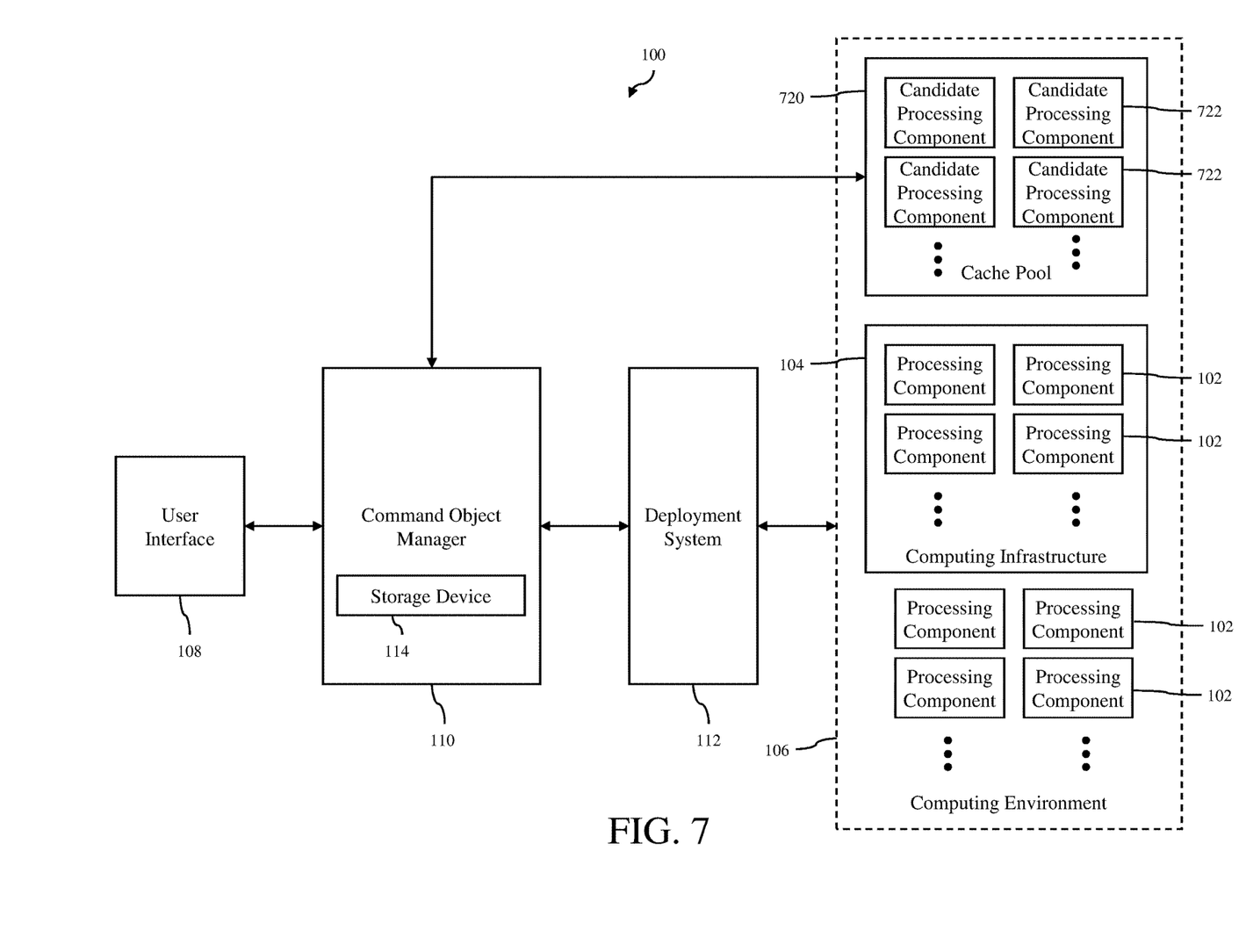
FIG. 7 is a block diagram of the PCD system in accordance with another embodiment of the invention.

Turning now to FIG. 7, the PCD system 100 in accordance with another embodiment of the invention is shown. In this embodiment, the PCD system maintains a cache pool 720 of candidate processing components 722. In the illustrated embodiment, the cache pool is maintained in the computing environment 106. Thus, the candidate processing components are hosted in the host computers 404 of the computing environment. However, in other embodiments, the cache pool can be maintained outside of the computing environment.

In this embodiment, the command object manager 110 manages the cache pool 720. In particular, the command object manager can create candidate processing components to be placed in the cache pool or deploy one or more candidate processing components in the cache pool into the computing environment 106. In some situations, deploying a candidate processing component in the cache pool into the computing environment may involve only activating the candidate processing component to run in the computing environment. In other situations, deploying a candidate processing component in the cache pool into the computing environment may involve migrating the candidate processing component from the cache pool to the computing environment and activating the candidate processing component in the computing environment. The cache pool may be dynamic, i.e., the inventory of the candidate processing components in the cache pool may vary over time, e.g., with respect to the number and/or type of the candidate processing components in the cache pool.

The cache pool 720 is used to accelerate the deployment process when a new processing component needs to be deployed in the computing environment, e.g., to satisfy a requirement specified in an annotated command object. If the required processing component can be found in the cache pool, there would be no need to actually deploy a new processing component in the computing environment. The matching candidate processing component in the cache pool can instead be deployed in the computing environment to satisfy the requirement.

In a particular implementation, the command object manager 110 efficiently manages the inventory in the cache pool 720 to ensure that the most frequently sought processing components are maintained in the cache pool. When a required processing component cannot be found in the cache pool, i.e., "cache miss", the command object manager will instruct the deployment system 112 to create two instances of the required processing component. One of the newly created processing components will be deployed in the computing environment 106. The other newly created processing component will be placed in the cache pool for future use. When a required processing component is found in the cache pool, i.e., "cache hit", the command object manager will deploy the found candidate processing component into the computing environment. In addition, another processing component that is identical to the found candidate processing component will be created in the cache pool to replace the candidate processing component that was deployed.

Figure 8:
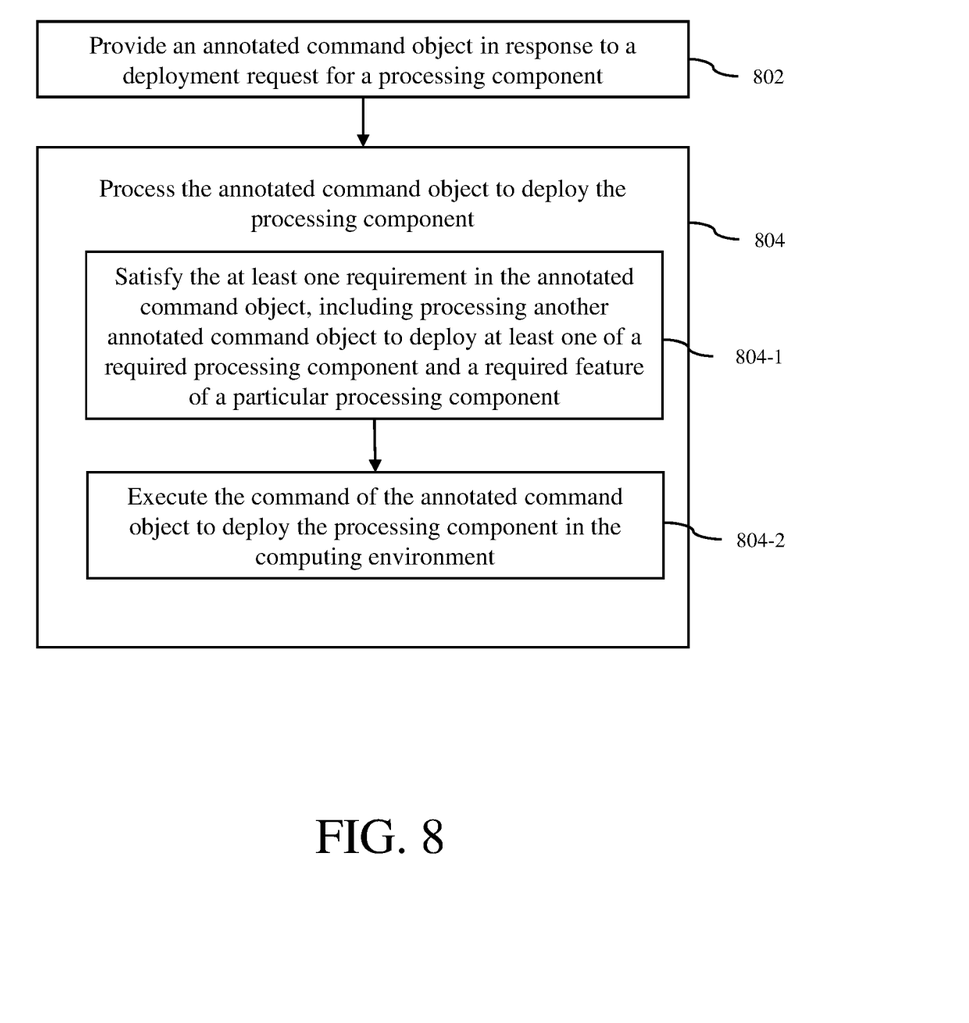
FIG. 8 is a flow diagram of a method for deploying a processing component of a computing infrastructure in a computing environment with host computers in accordance with an embodiment of the invention.

A method for deploying a processing component of a computing infrastructure in a computing environment with host computers in accordance with an embodiment of the invention is now described with reference to the process flow diagram of FIG. 8. At block 802, an annotated command object is provided in response to a deployment request for the processing component. The annotated command object includes an identifier, at least one requirement and a command. Next, at block 804, the annotated command object is processed to deploy the processing component. Block 804 includes two sub-blocks 804-1 and 804-2. At sub-block 804-1, the at least one requirement in the annotated command object is satisfied, which includes processing another annotated command object to deploy at least one of a required processing component and a required feature of a particular processing component. At sub-block 804-2, the command of the annotated command object is executed to deploy the processing component in the computing environment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner. Also, some of the steps can be repeated multiple times.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

The components of the embodiments as generally described in this document and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for deploying a processing component of a computing infrastructure in a computing environment with host computers, the method comprising:
   providing an annotated command object in response to a deployment request for the processing component, the annotated command object including an identifier, at least one requirement and a command, wherein the at least one requirement of the annotated command object includes an Internet Protocol (IP) address of a required processing component for the processing component that is used as an input parameter for the annotated command object; and
   processing the annotated command object to deploy the processing component, the processing comprising:
      satisfying the at least one requirement in the annotated command object, including processing another annotated command object to deploy the required processing component, wherein the another annotated command object includes output parameters including the IP address of the required processing component, wherein processing the another annotated command object results in the IP address of the required processing component that is used as an input to the annotated command object, wherein satisfying the at least one requirement in the annotated command object is repeated until all the requirements of the annotated command object have been satisfied; and
      executing the command of the annotated command object to deploy the processing component.

2. The method of claim 1, wherein the command includes at least one of a script, an executable file, a file path and a Uniform Resource Identifier satisfying a particular protocol endpoint.

3. The method of claim 1, wherein the processing the annotated command object further includes using information from the at least one requirement as one or more input parameters of the annotated command object.

4. The method of claim 1, wherein the processing the annotated command object further includes retrieving one or more output parameters when the processing component is deployed.

5. The method of claim 1, wherein the satisfying the at least one requirement in the annotated command object includes searching for a target processing component required for the at least one requirement in the computing environment.

6. The method of claim 1, wherein the executing the command of the annotated command object includes creating the processing component in a host computer of the computing environment.

7. The method of claim 1, wherein the satisfying the at least one requirement in the annotated command object includes searching for a target processing component required for the at least one requirement in a cache pool of candidate processing components in the computing environment.

8. The method of claim 7, wherein the candidate processing components in the cache pool are in a quiesced state.

9. The method of claim 7, wherein the satisfying the at least one requirement in the annotated command object further includes creating two instances of the target processing component when the target processing component cannot be found in the cache pool, where one of the two instances is placed in the cache pool for subsequent use and the other of the two instances is placed in the computing environment.

10. A non-transitory computer-readable storage medium containing program instructions for a method for deploying a processing component of a computing infrastructure in a computing environment with host computers, wherein execution of the program instructions by one or more processors of a computer system causes the one or more processors to perform steps comprising:
   providing an annotated command object in response to a deployment request for the processing component, the annotated command object including an identifier, at least one requirement and a command, wherein the at least one requirement of the annotated command object includes an Internet Protocol (IP) address of a required processing component for the processing component that is used as an input parameter for the annotated command object; and processing the annotated command object to deploy the processing component, the processing comprising:

satisfying the at least one requirement in the annotated command object, including processing another annotated command object to deploy the required processing component, wherein the another annotated command object includes output parameters including the IP address of the required processing component, wherein processing the another annotated command object results in the IP address of the required processing component that is used as an input to the annotated command object, wherein satisfying the at least one requirement in the annotated command object is repeated until all the requirements of the annotated command object have been satisfied; and executing the command of the annotated command object to deploy the processing component.

11. The computer-readable storage medium of claim 10, wherein the command includes at least one of a script, an executable file, a file path and a Uniform Resource Identifier satisfying a particular protocol endpoint.

12. The computer-readable storage medium of claim 10, wherein the processing the annotated command object further includes using information from the at least one requirement as one or more input parameters of the annotated command object.

13. The computer-readable storage medium of claim 10, wherein the processing the annotated command object further includes retrieving one or more output parameters when the processing component is deployed.

14. The computer-readable storage medium of claim 10, wherein the satisfying the at least one requirement in the annotated command object includes searching for a target processing component required for the at least one requirement in the computing environment.

15. The computer-readable storage medium of claim 10, wherein the executing the command of the annotated command object includes creating the processing component in a host computer of the computing environment.

16. The computer-readable storage medium of claim 10, wherein the satisfying the at least one requirement in the annotated command object includes searching for a target processing component required for the at least one requirement in a cache pool of candidate processing components in the computing environment.

17. The computer-readable storage medium of claim 16, wherein the candidate processing components in the cache pool are in a quiesced state.

18. The computer-readable storage medium of claim 16, wherein the satisfying the at least one requirement in the annotated command object further includes creating two instances of the target processing component when the target processing component cannot be found in the cache pool, where one of the two instances is placed in the cache pool for subsequent use and the other of the two instances is placed in the computing environment.

19. A system comprising:
memory; and
at least one processor programmed to:
provide an annotated command object in response to a deployment request for the processing component, the annotated command object including an identifier, at least one requirement and a command, wherein the at least one requirement of the annotated command object includes an Internet Protocol (IP) address of a required processing component for the processing component that is used as an input parameter for the annotated command object; and
process the annotated command object to deploy the processing component,
wherein processing of the annotated command object comprises satisfying the at least one requirement in the annotated command object, including processing another annotated command object to deploy the required processing component, wherein the another annotated command object includes output parameters including the IP address of the required processing component, wherein processing the another annotated command object results in the IP address of the required processing component that is used as an input to the annotated command object, wherein satisfying the at least one requirement in the annotated command object is repeated until all the requirements of the annotated command object have been satisfied, and executing the command of the annotated command object to deploy the processing component.

20. The system of claim 19, wherein the command includes at least one of a script, an executable file, a file path and a Uniform Resource Identifier satisfying a particular protocol endpoint.

21. The system of claim 19, wherein the at least one processor is programmed to use information from the at least one requirement as one or more input parameters of the annotated command object.

22. The system of claim 19, wherein the at least one processor is programmed to retrieve one or more output parameters when the processing component is deployed.

23. The system of claim 19, wherein the at least one processor is programmed to search for a target processing component required for the at least one requirement in a computing environment.

24. The system of claim 19, wherein the at least one processor is programmed to create the processing component in a host computer of a computing environment.

25. The system of claim 19, wherein the at least one processor is programmed to search for a target processing component required for the at least one requirement in a cache pool of candidate processing components in a computing environment.

26. The system of claim 25, wherein the candidate processing components in the cache pool are in a quiesced state.

27. The system of claim 25, wherein the at least one processor is programmed to create two instances of the target processing component when the target processing component cannot be found in the cache pool, where one of the two instances is placed in the cache pool for subsequent use and the other of the two instances is placed in the computing environment.

* * * * *